(12) United States Patent
Nun et al.

(10) Patent No.: US 8,062,700 B2
(45) Date of Patent: Nov. 22, 2011

(54) CERAMIC WALL CLADDING COMPOSITES THAT REFLECT IR RADIATION

(75) Inventors: Edwin Nun, Billerbeck (DE); Heike Bergandt, Marl (DE); Andreas Gutsch, Luedinghausen (DE); Gerhard Geipel, Haltern am See (DE)

(73) Assignee: Evonik Degussa GmbH, Essen (DE)

( * ) Notice: Subject to any disclaimer, the term of this patent is extended or adjusted under 35 U.S.C. 154(b) by 790 days.

(21) Appl. No.: 12/094,321

(22) PCT Filed: Nov. 24, 2006

(86) PCT No.: PCT/EP2006/068864
§ 371 (c)(1),
(2), (4) Date: May 20, 2008

(87) PCT Pub. No.: WO2007/087910
PCT Pub. Date: Aug. 9, 2007

(65) Prior Publication Data
US 2008/0283171 A1  Nov. 20, 2008

(30) Foreign Application Priority Data
Jan. 11, 2006  (DE) .......... 10 2006 001 640

(51) Int. Cl.
*B05B 5/00* (2006.01)
(52) U.S. Cl. .......... 427/160; 427/383.1; 427/418
(58) Field of Classification Search .......... 427/160
See application file for complete search history.

(56) References Cited

U.S. PATENT DOCUMENTS

| | | | |
|---|---|---|---|
| 4,215,168 A | 7/1980 | Yonemura et al. | |
| 4,433,025 A | 2/1984 | Pusch et al. | |
| 6,096,173 A | 8/2000 | Von Hippel et al. | |
| 6,309,545 B1 * | 10/2001 | Penth et al. | 210/500.25 |
| 6,458,750 B1 | 10/2002 | Dardin et al. | |
| 7,235,298 B2 | 6/2007 | Katusic et al. | |
| 7,288,501 B2 | 10/2007 | Auer et al. | |
| 7,374,743 B2 | 5/2008 | Katusic et al. | |
| 7,525,788 B2 | 4/2009 | Hoerpel et al. | |
| 2001/0036437 A1 | 11/2001 | Gutsch et al. | |
| 2001/0055639 A1 | 12/2001 | Moritz et al. | |
| 2003/0206854 A1 | 11/2003 | Gutsch et al. | |
| 2005/0221192 A1 | 10/2005 | Hennige et al. | |
| 2006/0141223 A1 | 6/2006 | Oles et al. | |
| 2006/0147675 A1 | 7/2006 | Nun et al. | |
| 2006/0156475 A1 | 7/2006 | Oles et al. | |
| 2006/0172641 A1 | 8/2006 | Hennige et al. | |
| 2007/0175362 A1 | 8/2007 | Gutsch et al. | |
| 2007/0184993 A1 | 8/2007 | Scherer et al. | |
| 2007/0213237 A1 | 9/2007 | Scherer et al. | |
| 2007/0219101 A1 | 9/2007 | Scherer et al. | |
| 2007/0254178 A1 | 11/2007 | Nun | |
| 2008/0020190 A1 | 1/2008 | Nun et al. | |
| 2008/0032197 A1 | 2/2008 | Horpel et al. | |
| 2008/0084686 A1 | 4/2008 | Gutsch et al. | |
| 2008/0138700 A1 | 6/2008 | Horpel et al. | |
| 2009/0078485 A1 | 3/2009 | Gutsch et al. | |
| 2010/0000079 A1 | 1/2010 | Horpel et al. | |
| 2010/0003401 A1 | 1/2010 | Horpel et al. | |

FOREIGN PATENT DOCUMENTS

| | | |
|---|---|---|
| DE | 42 13 747 | 10/1993 |
| DE | 10 2004 006 612 | 8/2005 |
| EP | 0 375 575 | 6/1990 |
| EP | 1 591 503 | 11/2005 |
| JP | 01 006198 | 1/1989 |
| JP | 05 156055 | 6/1993 |
| JP | 2001 159099 | 6/2001 |
| WO | 98 51747 | 11/1998 |

OTHER PUBLICATIONS

U.S. Appl. No. 60/021,600, filed Jul. 11, 1996, Riemenschneider, et al.
U.S. Appl. No. 08/842,775, filed Apr. 17, 1997, Riemenschneider, et al.
U.S. Appl. No. 09/441,439, filed Nov. 17, 1999, Barthold, et al.
U.S. Appl. No. 60/194,367, filed Apr. 4, 2002, Michael, et al.
U.S. Appl. No. 12/746,683, filed Jun. 7, 2010, Hedrich, et al.
U.S. Appl. No. 12/161,031, filed Jul. 16, 2008, Nun, et al.
U.S. Appl. No. 12/093,025, filed May 8, 2008, Nun, et al.
U.S. Appl. No. 12/067,855, filed Mar. 24, 2008, Nun, et al.
U.S. Appl. No. 12/092,086, filed Apr. 30, 2008, Nun, et al.
U.S. Appl. No. 12/092,084, filed Apr. 30, 2008, Nun, et al.
U.S. Appl. No. 12/159,103, filed Jun. 25, 2008, Nun, et al.

* cited by examiner

*Primary Examiner* — Necholus Ogden, Jr.
(74) *Attorney, Agent, or Firm* — Oblon, Spivak, McClelland, Maier & Neustadt, L.L.P.

(57) ABSTRACT

A method for producing coated substrates with IR radiation reflecting properties is provided.
The method includes applying a composition containing an inorganic compound onto at least one side of the substrate, drying the composition, and applying at least one coating containing a silane onto the dried composition wherein the composition and/or the coating contains at least one IR radiation reflecting pigment having a core and an electrical current conducting layer containing tin oxides and/or titanium oxides applied on the core.

35 Claims, No Drawings

CERAMIC WALL CLADDING COMPOSITES THAT REFLECT IR RADIATION

The subject-matter of the present invention relates to a method for producing coated substrates with IR radiation reflecting properties, and to substrates which can be obtained by the aforementioned method.

Since the origin of human settlement, attempts have been made either to keep heat inside houses or to prevent it from entering. In the past, for example, some stabilization of the internal temperature of a house has been achieved using two walls separated by an air gap.

It is known that mirrors reflect both visible light and IR radiation. However, it is not practicable to line a room with mirrors.

Metal foils, which are fitted behind plaster in a room, constitute a means known for many years for reducing heat loss, particularly behind heaters. A disadvantage, however, is the poor adhesion of the metal foils to the plaster or a wall.

Coatings with IR radiation reflecting substances are likewise known. A disadvantage, however, is that such coatings always lead to one-colored surfaces, which are often glossy. Decoration is not freely selectable.

The introduction of metal powder into building materials very often leads to corrosion problems. These are often manifested by loss of the building substance's mechanical properties and/or discolorations.

It is a technical object of the present invention to overcome the disadvantages of the prior art, and in particular to provide a coated substrate having IR radiation reflecting properties and a method for its production, with which shielding against IR radiation is reliably ensured, the substrate can be produced more cost-effectively and with which the lining of rooms is simplified. A further intention is to reduce the quantitative proportion of substance which effects the IR radiation shielding.

The technical object of the present invention is achieved by a method for coating substrates, comprising the steps of:
a) preparing a substrate,
b) applying a composition onto at least one side of the substrate, the composition containing an inorganic compound, the inorganic compound containing at least one metal and/or semimetal selected from the group Sc, Y, Ti, Zr, Nb, V, Cr, Mo, W, Mn, Fe, Co, B, Al, In, Tl, Si, Ge, Sn, Zn, Pb, Sb, Bi or mixtures thereof and at least one element selected from the group Te, Se, S, O, Sb, As, P, N, C, Ga or mixtures thereof,
c) drying the composition applied in step b),
d) applying at least one coating onto the at least one side of the substrate onto which the composition was applied in step b), the coating containing a silane of the general formula $(Z^1)Si(OR)_3$, where $Z^1$ is R, OR or Gly (Gly=3-glycidyloxypropyl) and R is an alkyl radical having from 1 to 18 carbon atoms and all R may be identical or different, oxide particles selected from the oxides of Ti, Si, Zr, Al, Y, Sn, Zn, Ce or mixtures thereof, and an initiator, the coating preferably containing 3-aminopropyltrimethoxysilane and/or 3-aminopropyltriethoxysilane and/or N-2-aminoethyl-3-aminopropyltrimethoxysilane, and
e) drying the coating applied in step d),
the composition of step b) and/or the coating of step d) containing at least one IR radiation reflecting pigment and the IR radiation reflecting pigment comprising a core, an electrical current conducting layer containing tin oxides and/or titanium oxides being applied on the core.

The method of the present invention is not limited to any specific substrates. The substrates may be either open-pored or closed-pored. The substrate in step a) may preferably be a flexible and/or rigid substrate. In a preferred embodiment, the substrate in step a) is a cloth, a fabric, a mesh, a foil, a textile and/or sheet metal. It is also preferable for the substrate to be a paper substrate.

Preferably, the substrate in step a) is essentially thermally stable at a temperature of more than 100° C. In a further preferred embodiment, the substrate in step a) is essentially thermally stable under the drying conditions of step c) and/or e). In this context, the term "thermally stable" is intended to mean that the structure of the substrate is essentially unchanged by drying the applied coatings.

In a preferred embodiment, the inorganic compound of step b) is selected from $TiO_2$, $Al_2O_3$, $SiO_2$, $ZrO_2$, $Y_2O_3$, BC, SiC, $Fe_2O_3$, SiN, SiP, alumosilicates, aluminum phosphates, zeolites, partially exchanged zeolites or mixtures thereof. Preferred zeolites are e.g. ZSM-5, Na-ZSM-5 or Fe-ZSM-5, or amorphous microporous mixed oxides which may contain up to 20 percent of non-hydrolyzable organic compounds, e.g. vanadium oxide-silicon oxide glass or aluminum oxide-silicon oxide-methylsilicon sesquioxide glasses.

The inorganic compound of step b) preferably has a particle size of from 1 nm to 10,000 nm, more preferably from 5 nm to 5000 nm, preferably from 10 nm to 2000 nm, in a further preferred embodiment from 10 to 1000 nm, preferably from 15 nm to 700 nm and most preferably from 20 nm to 500 nm. It may be preferable for the composite material according to the invention to comprise at least two particle size fractions of the at least one inorganic compound. It may likewise be preferable for the substrate according to the invention to comprise at least two particle size fractions of at least two inorganic compounds. The particle size ratio may be from 1:1 to 1:10,000, preferably from 1:1 to 1:100. The quantity ratio of the particle size factions in the composition of step b) may preferably be from 0.01:1 to 1:0.01. The composition of step b) is preferably a suspension, which is preferably an aqueous suspension. The suspension may preferably contain a liquid selected from water, alcohol, acid or a mixture thereof.

The inorganic compound of step b) is preferably obtained by hydrolyzing a precursor of the inorganic compound containing the metal and/or semimetal. The hydrolysis may be carried out e.g. using water and/or alcohol. An initiator which is preferably an acid or base, and which is preferably an aqueous acid or base, may be present during the hydrolysis.

The precursor of the inorganic compound is preferably selected from metal nitrate, metal halide, metal carbonate, metal alcoholate, metal halide, semimetal alcoholate or mixtures thereof. Preferred precursors are e.g. titanium alcoholates, e.g. titanium isopropylate, silicon alcoholates, e.g. tetraethoxysilane, zirconium alcoholates. Preferred metal nitrates are e.g. zirconium nitrate. In a preferred embodiment, the composition contains at least half the molar ratio of water, water vapor or ice in relation to the hydrolyzable precursor, expressed in terms of the hydrolyzable group of the precursor.

In a preferred embodiment, the composition of step b) is a sol. In a preferred embodiment it is possible to use commercially available sols, e.g. titanium nitrate sol zirconium nitrate sol or silica sol.

In a further preferred embodiment, the electrical current conducting layer of the IR radiation reflecting pigment contains tin oxide and/or titanium oxide doped with at least one halogen, the halogen preferably being selected from fluorine, chlorine, bromine, iodine or mixtures thereof.

Preferably, the core of the IR radiation reflecting pigment is encapsulated essentially fully or preferably fully by the electrically conductive layer.

In a preferred embodiment, the at least one IR radiation reflecting pigment is contained in the composition of step b). Further preferably, the at least one IR radiation reflecting pigment is contained in the coating of step d). Preferably, the at least one IR radiation reflecting pigment is contained in the composition of step b) and in the coating of step d).

The core of the IR radiation reflecting pigment may contain metal oxides and/or silicon oxides. The core may or may not be in the form of platelets. Cores in the form of platelets, which are preferred, preferably have an extent of less than 500 µm in the principal dimension and in particular less than 250 µm, and the thickness is preferably less than 10 µm, in particular not more the 5 µm and more particularly from 0.1 µm to 3 µm. The ratio (aspect ratio) of the extent in the principal dimension to the thickness is preferably more than 3 and more preferably more than 5 for substrates in platelet form.

The core may contain e.g. $SiO_2$ and/or metal oxides e.g. $Fe_2O_3$, $TiO_2$, $MTiO_3$, where M=Mg, Ca, Ba, Sr, and/or $Al_2O_3$, and/or $BaSO_4$ and/or $CaSO_4$. The core is preferably based on substrates which are in platelet form and/or transparent or semitransparent, e.g. mica, talc, kaolin, glass or other silicate materials. Metal platelets, e.g. aluminum platelets or metal oxides in platelet form, e.g. iron oxide or bismuth oxychloride in platelet form, may furthermore constitute the core.

At least one insulating layer is preferably arranged between the core of the IR radiation reflecting pigment and the electrical current conducting layer. The insulating layer may preferably contain a hydrated silicon dioxide layer or another insoluble silicate. This insulating layer is preferably applied according to the method specified in EP 0,375,575. The core may nevertheless preferably be coated first with one or more layers of e.g. chromium oxide, iron oxide, zirconium oxide, aluminum oxide, tin oxide and/or further colorless or colored metal oxides.

The insulating layer preferably contains about 3-6 wt. % $SiO_2$, and more preferably about 5 wt. % $SiO_2$, expressed in terms of the total mass of the IR radiation reflecting pigment.

In a preferred embodiment, the material of which the insulating layer is made has a conductivity of less than $10^{-6}$ S/cm, more preferably less than $5 \times 10^{-7}$ S/cm and most preferably less than $10^{-7}$ S/cm. The conductivity may be determined according to the teaching of DE 42 13 747 A1, the resistivity being converted into the conductivity.

The electrical current conducting layer may contain either tin oxide or titanium oxide doped with halogen or a mixture of the aforementioned oxides. It is possible to use arbitrarily composed mixed oxides of $SnO_{2-x} X_x$ and/or $TiO_{2-x} X_x$, X being selected from fluorine, chlorine, bromine, iodine or mixtures thereof and x being less than 2 and more than 0.

The electrical current conducting layer may preferably also contain further metal oxides e.g. chromium oxide, iron oxide, zirconium oxide, aluminum oxide, tin oxide, e.g. in order to increase the mechanical stability.

The electrical current conducting layer preferably has a resistivity of from 5 to $2 \times 10^5$ Ωcm. The resistivity may be determined according to the teaching of DE 42 13 747 A1.

The IR radiation reflecting pigment preferably has a reflectivity of more than 75% on average, more preferably more than 80% on average, in particular more than 85% on average and preferably more than 90% on average in the wavelength range of from 4000 nm to 20 000 nm. The expression on average means that there is a reflection in said range as a mean value over the specified wavelength range.

The IR radiation reflecting pigment preferably has a mass-average particle size of less than 500 µm, more preferably from 100 µm to 500 µm and most preferably from 200 µm to 500 µm.

The IR radiation reflecting pigment may be prepared according to the teaching of DE 42 13 747 A1.

The composition of step b) preferably contains an initiator. The initiator may preferably be an acid or base, which is preferably an aqueous acid or base.

The composition of step b) is preferably produced by firstly preparing a dispersion/suspension of the inorganic compound. The IR radiation reflecting pigment is then subsequently dispersed in it.

The drying of the composition in step c) is preferably carried out by heating to a temperature of between 50° C. and 1000° C. In a preferred embodiment, it is dried for from 1 minute to 2 hours at a temperature of from 50° C. to 100° C.

In another preferred embodiment, the drying is carried out for from 1 second to 10 minutes at a temperature of from 100° C. to 800° C. in step d).

The drying of step c) may be carried out by means of warmed air, hot air, infrared radiation, microwave radiation or electrically generated heat.

In a preferred embodiment, R in the general formula $(Z^1)Si(OR)_3$ is an alkyl radical having 1, 2, 3, 4, 5, 6, 7, 8, 9, 10, 11, 12, 13, 14, 15, 16, 17 and/or 18 carbon atoms.

In a preferred embodiment, the coating of step d) contains a second silane of the general formula $(Z^2)_z Si(OR)_{4-z}$, where R is an alkyl radical having from 1 to 6 carbon atoms and $Z^2$ is $H_a F_b C_n$, a and b being whole numbers, all R may be identical or different, a+b=1+2 n, z=1 or 2 and n is from 1 to 16, or for the case that $Z^1$ Gly, $Z^2$ is Am (Am=3-aminopropyl) with z=1. Preferably, n is 1, 2, 3, 4, 5, 6, 7, 8, 9, 10, 11, 12, 13, 14, 15 and/or 16. In a preferred embodiment, R in the general formula $(Z^2)Si(OR)_3$ is an alkyl radical having 1, 2, 3, 4, 5, 6, 7, 8, 9, 10, 11, 12, 13, 14, 15 and/or 16 carbon atoms.

In a further preferred embodiment, the coating of step d) contains 3-glycidyloxypropyltriethoxysilane and/or 3-glycidyloxypropyltrimethoxysilane as the silane and/or 3-aminopropyltrimethoxysilane and/or 3-aminopropyltriethoxysilane and/or N-2-aminoethyl-3-aminopropyltrimethoxysilane (DAMO) as the second silane. The coating of step d) preferably contains tetraethoxysilane as the silane and a silane of the formula $(H_a F_b C_n)_z Si(OR)_{4-z}$ as the second silane, where a and b are whole numbers, a+b=1+2 n, z is 1 or 2, n is from 1 to 16 and all R may be identical or different, all R preferably being identical and containing from 1 to 6 carbon atoms.

The coating of step d) more preferably contains tetraethoxysilane, methyltriethoxysilane, octyltriethoxysilane and/or hexadecyltrimethoxysilane as the silane and/or 3,3,4,4,5,5,6,6,7,7,8,8,8-tridecafluoroctyltriethoxysilane as the second silane.

In a preferred embodiment, the coating of step d) contains an acid or base as initiator, which is preferably an aqueous acid or base.

The surface of the oxide particles contained in the coating of step d) is preferably hydrophobic. There are preferably organic radicals $X_{1+2n} C_n$ bound to silicon atoms on the surface of the oxide particles of the coating of step d), when n is from 1 to 20 and X is hydrogen and/or fluorine. The organic radicals may be identical or different. Preferably, n is 1, 2, 3, 4, 5, 6, 7, 8, 9, 10, 11, 12, 13, 14, 15, 16, 17, 18, 19 and/or 20.

The groups bound to silicon atoms are preferably methyl, ethyl, propyl, butyl and/or pentyl groups. In a particularly preferred embodiment, trimethylsilyl groups are bound to the surface of the oxide particles. The organic residues may preferably be cleaved, and more preferably hydrolyzed.

The oxide particles of the coating of step d) may be selected from the oxides of Ti, Si, Zr, Al, Y, Sn, Zn, Ce or contain mixtures thereof. Preferably, the oxide particles of the coating of step d) are partially hydrolyzed on the surface of the oxide particles under the reaction conditions of step d). Reactive centers are preferably formed thereby, which react with the organic silicon compounds of the coating of step d). These organic silicon compounds may be bound covalently to the oxide particles by e.g. —O-bonds during the drying of step e). The oxide particles are thereby crosslinked with the cured coating. Therefore, the layer thickness of the cured coating can surprisingly be increased further.

The oxide particles may have an average particle size of from 10 to 1000 nm, preferably from 20 to 500 nm, more preferably from 30 to 250 nm. If the coating is to be transparent and/or colorless, then it is preferable to use only oxide particles which have an average particle size of from 10 to 250 nm. The average particle size refers to the particle size of the primary particles or, if the oxides are present as aggregates, to the size of the aggregates. The particle size is determined by light scattering methods, for example using a device of the type HORIBA LB 550® (from Retsch Technology).

The coating of step d) preferably contains a polymer. In the coating of step d), the polymer preferably has a mean mass-average molecular weight of at least 3000 g/mol. The mean mass-average molecular weight is preferably at least 5000 g/mol, more preferably at least 6000 g/mol and most preferably at least 10,000 g/mol.

The polymer of the coating of step d) preferably has an average degree of polymerization of at least 50. In a further preferred embodiment, the average degree of polymerization is at least 80, more preferably at least 95 and most preferably at least 150. The polymer of the coating of step d) is preferably selected from polyamide, polyester, epoxy resins, melamine-formaldehyde condensate, urethane-polyol resin or mixtures thereof.

Enough coating is preferably applied onto the substrate in step d) for there to be a layer of the dried coating with a layer thickness of from 0.05 to 10 μm after drying in step e). There is preferably a coating of step d) with a layer thickness of from 0.1 μm to 9 μm, more preferably from 0.2 μm to 8 μm and most preferably from 0.3 μm to 7 μm on the dried substrate.

The drying of the coating in step e) may be carried out by any method which is known to the person skilled in the art. In particular, the drying may be carried out in an oven. The drying is more preferably carried out with a hot air oven, circulating air oven, microwave oven or by infrared irradiation. In particular, the drying may preferably be carried out with the method and the drying times of step c). In a preferred embodiment, the coating of step e) is dried by heating to a temperature of between 50° C. and 1000° C.

In a further preferred embodiment, at least one further coating may be applied before the application of the coating in step b) and/or d). This further coating may e.g. be an impression. Such an impression may be applied by any printing method which is familiar to the person skilled in the art, in particular the offset printing method, flexo printing method, tampon printing or inkjet printing method.

In a further embodiment, at least one further coating may be applied after the application of the coating in step d). This further coating is not limited and may be any coating which is known to the person skilled in the art. In particular, this coating may also be an impression. In this case as well, the impression may be applied by any method which is familiar to the person skilled in the art, in particular the offset printing method, flexo printing method, tampon printing or inkjet printing method.

Coated substrates of the present invention surprisingly exhibit a very high flexibility. If the substrate is flexible, then the substrate can be bent without destroying or tearing the applied coatings. In particular, coatings may thereby be applied onto flexible nonwovens which fit to the surface contour of a background, without detrimentally affecting the coating. As mentioned above, a very wide variety of protective layers can be applied as a coating, in particular layers protecting against aggressive chemicals or dirt-repellent coatings. A decoration may, as a further advantage, be freely selected.

It is surprising that the coated substrates of the present invention exhibit sufficient reflection shielding against IR radiation. The coated substrates can be used as a substitute for the means known in the prior art for reflection/shielding rooms against IR radiation. The coated substrates of the present invention can furthermore be produced more efficiently than those of the prior art.

The coated substrate is preferably wallpaper for lining rooms.

The invention claimed is:

1. A method for coating substrates, comprising the steps of:
   a) preparing a substrate,
   b) applying a composition onto at least one side of the substrate, the composition containing an inorganic compound, said inorganic compound containing at least one metal and/or semimetal selected from the group Sc, Y, Ti, Zr, Nb, V, Cr, Mo, W, Mn, Fe, Co, B, Al, In, Tl, Si, Ge, Sn, Zn, Pb, Sb, Bi or mixtures thereof and at least one element selected from the group Te, Se, S, O, Sb, As, P, N, C, Ga or mixtures thereof,
   c) drying the composition applied in step b),
   d) applying at least one coating onto the at least one side of the substrate onto which the composition was applied in step b), said coating containing a silane of the general formula $(Z^1)Si(OR)_3$, where $Z^1$ is R, OR or Gly (Gly=3-glycidyloxypropyl) and R is an alkyl radical having from 1 to 18 carbon atoms wherein each R may be identical or different, oxide particles selected from the oxides of Ti, Si, Zr, Al, Y, Sn, Zn, Ce or mixtures thereof, and an initiator, and
   e) drying the coating applied in step d),
   the composition of step b) and/or the coating of step d) containing at least one IR radiation reflecting pigment comprising a core and an electrical current conducting layer containing tin oxides and/or titanium oxides applied on the core.

2. The method according to claim 1,
characterized in that
the substrate in step a) is a flexible and/or rigid substrate.

3. The method according to claim 1,
characterized in that
the substrate in step a) is a cloth, a fabric, a mesh, a foil and/or a textile.

4. The method according to claim 1,
characterized in that
the substrate in step a) is essentially thermally stable at a temperature of more than 100° C.

5. The method according to claim 1,
characterized in that
the substrate in step a) is essentially thermally stable under the drying conditions of step c) and/or e).

6. The method according to claim 1,
characterized in that
the inorganic compound of step b) is selected from TiO2, Al2O3, SiO2, ZrO2, Y2O3, BC, SiC, Fe2O3, SiN, SiP, alumosilicates, aluminum phosphates, zeolites, partially exchanged zeolites or mixtures thereof.

7. The method according to claim 1, characterized in that the inorganic compound of step b) has a particle size of from 1 nm to 10,000 nm.

8. The method according to claim 1, characterized in that the composition of step b) is an aqueous suspension.

9. The method according to claim 1, characterized in that the inorganic compound of step b) is obtained by hydrolyzing a precursor of the inorganic compound containing the metal and/or semimetal.

10. The method according to claim 9, characterized in that the precursor of the inorganic compound is selected from metal nitrate, metal halide, metal carbonate, metal alcoholate, semimetal halide, semimetal alcoholate or mixtures thereof.

11. The method according to claim 1, characterized in that the electrical current conducting layer of the IR radiation reflecting pigment contains tin oxide and/or titanium oxide doped with at least one halogen, the halogen preferably being selected from fluorine, chlorine, bromine, iodine or mixtures thereof.

12. The method according to claim 1, characterized in that at least one insulating layer is arranged between the core of the IR radiation reflecting pigment and the electrical current conducting layer.

13. The method according to claim 1, characterized in that the IR radiation reflecting pigment has a mass-average particle size of less than 500 μm.

14. The method according to claim 12, characterized in that the material of which the insulating layer is made has a conductivity of less than $10^{-6}$ S/cm.

15. The method according to claim 1, characterized in that the composition of step b) contains an initiator.

16. The method according to claim 15, characterized in that the initiator is an aqueous acid or base.

17. The method according to claim 1, characterized in that the composition of step b) is a sol.

18. The method according to claim 1, characterized in that the drying of the composition in step c) is carried out by heating to a temperature of between 50° C. and 1000° C.

19. The method according to claim 1, characterized in that the coating of step d) contains a second silane of the general formula $(Z^2)_z Si(OR)_{4-z}$, where R is an alkyl radical having from 1 to 8 carbon atoms and $Z^2$ is $H_a F_b C_n$, a and b being whole numbers, each R may be identical or different, a+b=1+2n, z=1 or 2 and n is from 1 to 16, or for the case that $Z^1$ is Gly, $Z^2$ is Am (Am=3-aminopropyl) with z=1.

20. The method according to claim 19, characterized in that the coating of step d) contains 3-glycidyloxypropyltriethoxysilane and/or 3-glycidyloxypropyltrimethoxysilane as the silane and/or 3-aminopropyltrimethoxysilane and/or 3-aminopropyltriethoxysilane and/or N-2-aminoethyl-3-aminopropyltrimethoxysilane as the second silane.

21. The method according to claim 1, characterized in that the coating of step d) contains tetraethoxysilane as the silane and a silane of the formula $(H_a F_b C_n)_z Si(OR)_{4-z}$, as a second silane, where a and b are whole numbers, a+b=1+2n, z is 1 or 2, n is from 1 to 16 and each R may be identical or different.

22. The method according to claim 1, characterized in that the coating of step d) contains tetraethoxysilane, methyltriethoxysilane, octyltriethoxysilane and/or hexadecyltrimethoxysilane as the silane and/or 3,3,4,4,5,5,6,6,7,7,8,8,8-tridecafluorooctyltriethoxysilane as the second silane.

23. The method according to claim 1, characterized in that the coating of step d) contains an initiator, which is an aqueous acid or base.

24. The method according to claim 1, characterized in that the oxide particles contained in the coating of step d) have a hydrophobic surface.

25. The method according to claim 1, characterized in that there are organic radicals X1+2nCn bound to silicon atoms on the surface of the oxide particles of the coating of step d), wherein n is from 1 to 20 and X is hydrogen and/or fluorine.

26. The method according to claim 1, characterized in that the coating of step d) contains a polymer which has a mean mass-average molecular weight of at least 3000 g/mol.

27. The method according to claim 26, characterized in that the polymer of the coating of step d) has an average degree of polymerization of at least 50.

28. The method according to claim 26, characterized in that the polymer of the coating of step d) is selected from polyamide, polyester, epoxy resins, melamine-formaldehyde condensate, urethane-polyol resin or mixtures thereof.

29. The method according to claim 1, characterized in that enough coating is applied onto the substrate in step d) for there to be a layer of the dried coating with a layer thickness of from 0.05 to 10 μm after drying in step e).

30. The method according to claim 1, characterized in that at least one further coating is applied before the application of the coating in step b) and/or d).

31. The method according to claim 1, characterized in that at least one further coating is applied after the application of the coating in step d).

32. The method according to claim 1, characterized in that the drying of the coating in step e) is carried out by heating to a temperature of between 50° C. and 1000° C.

33. A coated substrate which can be obtained according to the method of claim 1.

34. The substrate according to claim 33, characterized in that it is wallpaper.

35. A method of wallpapering using the coated substrate according to claim 33.

* * * * *